United States Patent
Boss et al.

(10) Patent No.: US 11,308,816 B2
(45) Date of Patent: *Apr. 19, 2022

(54) AUTOMATED VEHICLE CONTROL

(71) Applicant: KYNDRYL, INC., New York, NY (US)

(72) Inventors: Gregory J. Boss, Saginaw, MI (US); Luis C. Cruz Huertas, San Jose (CR); Rick A. Hamilton, II, Charlottesville, VA (US); Edgar A. Zamora Duran, Heredia (CR)

(73) Assignee: Kyndryl, Inc., New York, NY (US)

( * ) Notice: Subject to any disclaimer, the term of this patent is extended or adjusted under 35 U.S.C. 154(b) by 200 days.

This patent is subject to a terminal disclaimer.

(21) Appl. No.: 16/535,351

(22) Filed: Aug. 8, 2019

(65) Prior Publication Data

US 2019/0362637 A1 Nov. 28, 2019

Related U.S. Application Data

(63) Continuation of application No. 15/967,726, filed on May 1, 2018, now Pat. No. 10,573,187, which is a (Continued)

(51) Int. Cl.
*G08G 5/00* (2006.01)
*G05B 19/042* (2006.01)
(Continued)

(52) U.S. Cl.
CPC ........... *G08G 5/0039* (2013.01); *G01C 21/20* (2013.01); *G05B 19/042* (2013.01);
(Continued)

(58) Field of Classification Search
CPC .. G08G 5/0039; G08G 5/0056; G08G 5/0082; G08G 5/0091; G08G 5/0034;
(Continued)

(56) References Cited

U.S. PATENT DOCUMENTS

| 4,827,418 A | 5/1989 | Gerstenfeld |
| 8,090,525 B2 | 1/2012 | Jacques |

(Continued)

FOREIGN PATENT DOCUMENTS

WO 2014115139 A1 7/2014

OTHER PUBLICATIONS

GCN Staff; Researchers pilot air traffic control system for drones; Retrieved from the Internet; URL https://gcn.com/articles/2014/10/21/nasa-drone-air-traffic-control.aspx; Oct. 21, 2014; 3 pages.

(Continued)

*Primary Examiner* — Paula L Schneider
(74) *Attorney, Agent, or Firm* — Schmeiser, Olsen & Watts; Erik Swanson

(57) ABSTRACT

A method and system for automatically controlling a vehicle is provided. The method includes generating an original route of travel for a first vehicle for travel from an original location to a destination location. The vehicle is directed from the original location to the destination location such that the vehicle initiates motion and navigates the original route of travel towards the destination location in accordance with the original route of travel. Monitored vehicular attributes of the first vehicle are received and environmental attributes associated with the original route of travel are monitored with respect the first vehicle. Navigational issues associated with the vehicle traveling along the original route of travel are determined based on the monitored vehicular attributes and results of monitoring the environmental attributes. The navigational issues are used to determine if the vehicle should continue to travel along the original route of travel.

18 Claims, 4 Drawing Sheets

Related U.S. Application Data continuation of application No. 15/221,671, filed on Jul. 28, 2016, now Pat. No. 10,043,399.

(51) Int. Cl.
  *G01C 21/20* (2006.01)
  *H04L 29/08* (2006.01)
  *G08G 5/02* (2006.01)
  *H04L 67/12* (2022.01)

(52) U.S. Cl.
  CPC ......... *G08G 5/0034* (2013.01); *G08G 5/0056* (2013.01); *G08G 5/0069* (2013.01); *G08G 5/0082* (2013.01); *G08G 5/0091* (2013.01); *G08G 5/025* (2013.01); *H04L 67/12* (2013.01)

(58) Field of Classification Search
  CPC .... G08G 5/025; G08G 5/0069; G05B 19/042; G01C 21/20; H04L 67/12
  USPC .......................................................... 701/26
  See application file for complete search history.

(56) References Cited

U.S. PATENT DOCUMENTS

| | | | |
|---|---|---|---|
| 8,355,834 | B2 | 1/2013 | Duggan |
| 8,751,061 | B2 | 6/2014 | Coulmeau |
| 9,087,451 | B1 | 7/2015 | Jarrell |
| 9,171,473 | B1 | 10/2015 | McNally |
| 9,257,048 | B1 | 2/2016 | Offer |
| 9,472,106 | B2 * | 10/2016 | Bailey .................. G01C 23/00 |
| 10,043,399 | B2 | 8/2018 | Boss |
| 2015/0336667 | A1 | 11/2015 | Srivastava |
| 2018/0033314 | A1 | 2/2018 | Boss |
| 2018/0247543 | A1 | 8/2018 | Boss |

OTHER PUBLICATIONS

Google, NASA work together to design drone air-traflic-control system; Retrieved from the Internet; URL https://www.rt.com/USA/310705-drone-air-lraflic-control; Jul. 24, 2015; 9 pages.

Harris, Mark; NASA plans smart air traffic control for drones; Retrieved from the Internet; URL https://www.newscientest.com/article/dn27979-nasa-plans-smart-air-traffic-control-for-drones/; Jul. 30, 2015; 5 pages.

Harris, Mark; US testing an 'air traffic control system' for drones; The Guardian; Retrieved from the Internet; URL http://www.theguardian.com/technology/2015/nov/26/drone-regulations-united-states-testing-air-traflic-control-system-precisionhawk; Nov. 26, 2015; 4 pages.

Pomerleau, Mark; How to do air uallic control for drones; Retrieved from the Internet; URL https://gcn.com/articles/2015/10/28/latas-drone-control.aspx; Oct. 28, 2015; 3 pages.

Simonite, Tom; Air Traffic Control for Drones; MIT Technology Review; Retrieved from the Internet; URL https://www.technologyreview.com/s/531811/air-traffic-control-for-drones/; Oct. 17, 2014; 6 pages.

Friedman, Mark J.; List of IBM Patents or Patent Applications Treated as Related; Aug. 8, 2019; 1 page.

* cited by examiner

AUTOMATED VEHICLE CONTROL

CROSS REFERENCE TO RELATED APPLICATIONS

This application is a continuation application claiming priority to Ser. No. 15/967,726 filed May 1, 2018, now U.S. Pat. No. 10,573,187 issued Feb. 25, 2020, which is a continuation application claiming priority to Ser. No. 15/221,671 filed Jul. 28, 2016 now U.S. patent Ser. No. 10/043,399 issued Aug. 7, 2018, the contents of which are hereby incorporated by reference.

FIELD

The present invention relates generally to a method for controlling vehicle travel and in particular to a method and associated system for improving automation control technology by modifying a vehicle route of travel based on detected external factors.

BACKGROUND

Generating travel routes typically includes an inaccurate process with little flexibility. Coordinating travel routes with unforeseen issues typically involves an unreliable process. Adjusting a route of travel to with respect to unforeseen issues may include a complicated process that may be time consuming and require a large amount of resources. Accordingly, there exists a need in the art to overcome at least some of the deficiencies and limitations described herein above.

SUMMARY

A first aspect of the invention provides an automated vehicle control method comprising: generating, by a processor of controller, an original route of travel for a first vehicle for travel from an original location to a destination location; directing, by said processor in accordance with said original route of travel, said vehicle from said original location to said destination location such that said vehicle initiates motion and navigates said original route of travel towards said destination location; receiving, by said processor from said first vehicle, monitored vehicular attributes of said first vehicle; monitoring, by said processor, environmental attributes associated with said original route of travel with respect said first vehicle; first determining, by said processor based on said monitored vehicular attributes and results of said monitoring said environmental attributes, navigational issues associated with said vehicle traveling along said original route of travel; and second determining, by said processor based on said navigational issues, if said vehicle should continue to travel along said original route of travel.

A second aspect of the invention provides a computer program product, comprising a computer readable hardware storage device storing a computer readable program code, said computer readable program code comprising an algorithm that when executed by a processor of a controller implements an automated vehicle control, said method comprising: generating, by said processor, an original route of travel for a first vehicle for travel from an original location to a destination location; directing, by said processor in accordance with said original route of travel, said vehicle from said original location to said destination location such that said vehicle initiates motion and navigates said original route of travel towards said destination location; receiving, by said processor from said first vehicle, monitored vehicular attributes of said first vehicle; monitoring, by said processor, environmental attributes associated with said original route of travel with respect said first vehicle; first determining, by said processor based on said monitored vehicular attributes and results of said monitoring said environmental attributes, navigational issues associated with said vehicle traveling along said original route of travel; and second determining, by said processor based on said navigational issues, if said vehicle should continue to travel along said original route of travel.

A third aspect of the invention provides a controller comprising a processor coupled to a computer-readable memory unit, said memory unit comprising instructions that when executed by the processor executes an automated vehicle control method comprising: generating, by said processor, an original route of travel for a first vehicle for travel from an original location to a destination location; directing, by said processor in accordance with said original route of travel, said vehicle from said original location to said destination location such that said vehicle initiates motion and navigates said original route of travel towards said destination location; receiving, by said processor from said first vehicle, monitored vehicular attributes of said first vehicle; monitoring, by said processor, environmental attributes associated with said original route of travel with respect said first vehicle; first determining, by said processor based on said monitored vehicular attributes and results of said monitoring said environmental attributes, navigational issues associated with said vehicle traveling along said original route of travel; and second determining, by said processor based on said navigational issues, if said vehicle should continue to travel along said original route of travel.

The present invention advantageously provides a simple method and associated system capable of generating travel routes.

DETAILED DESCRIPTION

Figure 1:
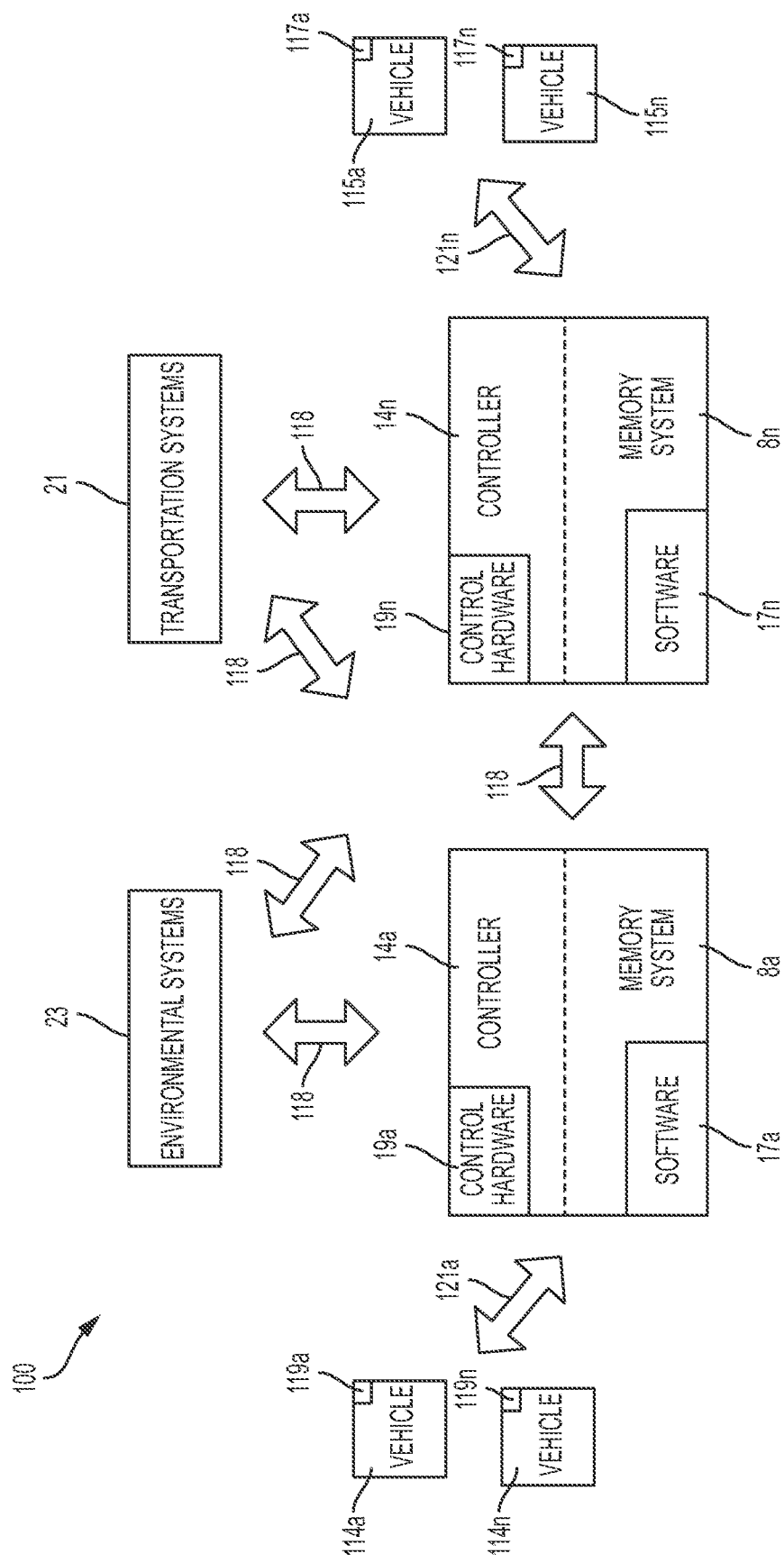
FIG. 1 illustrates a system for modifying a vehicle route of travel based on external factors, in accordance with embodiments of the present invention.

FIG. 1 illustrates a system 100 for modifying a vehicle route of travel based on external factors, in accordance with embodiments of the present invention. System 100 (i.e., controllers 14a . . . 14n) enables an improvement to a process for monitoring vehicles 114a . . . 114n and 115a . . . 115n and modifying an associated route of travel as follows:

1. Flight parameters of vehicles 114a . . . 114n and 115a . . . 115n are monitored during travel along an original route. The parameters may include state parameters and navigation parameters.
2. Current in flight events or incidents are detected during travel along the original route.
3. A message corresponding to a detected flight event is transmitted to all of controllers 14a . . . 14n.
4. A new travel route is generated based on analysis of the detected flight event.

System 100 of FIG. 1 includes controllers 14a . . . 14n in communication with environmental systems 23 and transportation systems 21 via networks 118. Additionally, controllers 14a . . . 14n may be in communication with each other. Controller 14a is in communication with vehicles 114a . . . 114n via a network 121a. Controller 14n is in communication with vehicles 115a . . . 115n via a network 121n. Controllers 14a . . . 14n each may be associated with a differing entity (e.g., different companies). Vehicles 114a . . . 114n (i.e., control hardware 119a . . . 119n internal to vehicles 114a . . . 114n) and 115a . . . 115n (i.e., control hardware 117a . . . 117n internal to vehicles 114a . . . 114n) and controllers 14a . . . 14n each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, vehicles 114a . . . 114n (i.e., control hardware 119a . . . 119n internal to vehicles 114a . . . 114n) and 115a . . . 115n (i.e., control hardware 117a . . . 117n internal to vehicles 114a . . . 114n) and controllers 14a . . . 14n may each comprise a specialized hardware device comprising specialized (non-generic) hardware and circuitry (i.e., specialized discrete non-generic analog, digital, and logic based circuitry) for executing a process described with respect to FIGS. 1-4. The specialized discrete non-generic analog, digital, and logic based circuitry may include proprietary specially designed components (e.g., a specialized integrated circuit designed for only implementing an automated process for modifying a vehicle route of travel based on external factors. Controller 14a includes a memory system 8a, software 17a, and control hardware 19a (all sensors and associated control hardware for enabling software 17a to execute a process for modifying a vehicle route of travel based on external factors). Controller 14n includes a memory system 8n, software 17n, and control hardware 19n (all sensors and associated control hardware for enabling software 17n to execute a process for modifying a vehicle route of travel based on external factors). Control hardware 119a . . . 119n and 117a . . . 117n may include sensors. Sensors may include, inter alia, GPS sensors, video recording devices, optical sensors, weight sensors, temperature sensors, pressure sensors, etc. The memory systems 8a and 8b may each include a single memory system. Alternatively, the memory systems 8a and 8b may each may include a plurality of memory systems. Each of vehicles 114a . . . 114n and 115a . . . 115n may comprise any vehicle that does not require a human operator to be located within the vehicles 114a . . . 114n and 115a . . . 115n such as, inter alia, a remote controlled vehicle (e.g., an aircraft flown by a pilot at a ground control station), an autonomously controlled vehicle (e.g., an aircraft controlled based on pre-programmed flight plans) and may include an intelligence algorithm that would enable vehicles 114a . . . 114n and 115a . . . 115n to know it's location and self-determine an original route of travel), a pre-programmed vehicle, etc. Alternatively, vehicles 114a . . . 114n and 115a . . . 115n may comprise any type of vehicle that includes a human operator located within the vehicle (e.g., an aircraft, an automobile, a boat or ship, a train, etc.). Vehicles 114a . . . 114n and 115a . . . 115n may include, inter alia, an aerial vehicle, a land based vehicle, a marine (water) based vehicle, etc. Environmental systems 23 may comprise any type of system (e.g., weather service system providing weather condition factors) for providing environmental related factors (to controllers 14a . . . 14n) for analysis with respect to modifying a vehicle route of travel. Transportation systems 21 may comprise any type of system (e.g., airport controller system providing airplane flight data) for providing additional vehicle travel related factors (to controllers 14a . . . 14n) for analysis with respect to modifying a vehicle route of travel.

System 100 of FIG. 1 enables a platform for autonomously controlling vehicle traffic (e.g., air traffic) and management and reprogramming a route of travel such that a vehicle (e.g., vehicles 114a . . . 114n and/or vehicles 115a . . . 115n) may depart from a home point location and a route of travel may be modified (during travel) based on external factors. System 1000 may utilize any type of network (e.g., 3G, 4G, 5G, etc.) to provide traffic guidance towards a departure location and destination location. External factors may include, inter alia, a travel altitude, a wind speed, a travel trajectory, a duration of travel, a frequency, etc.

System 100 enables the following implementation example for monitoring (flight based) vehicles 114a . . . 114n and 115a . . . 115n and modifying an associated (flight) route of travel:

An original route of travel (from a location to a destination) for a vehicle is selected by a company A. In response, a controller (e.g., controller 14a) generates a flight path (associated with the route of travel) based on: a brand of the vehicle, a serial number of the vehicle, a company of ownership (i.e., company A), a destination location and flight number, an estimated flight time duration, and weather related data. The flight path is loaded to the vehicle, the vehicle initiates motion, and the controller enables a vehicle monitoring process with respect to the following factors: a flight altitude, a wind speed, a flight trajectory, a duration of flight, a frequency, etc. If a detected factor is determined to create possible navigational issues with respect to travel along the original route of travel, a decision is executed with respect to continuation of travel along the original route of travel or a new route of travel is generated.

Figure 2:
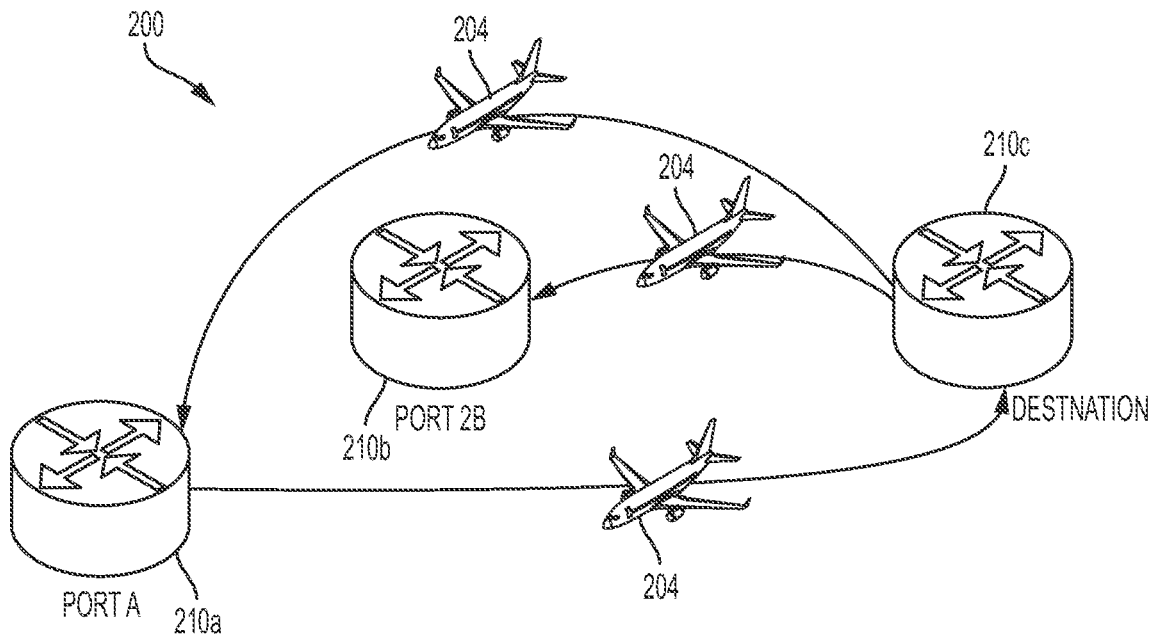
FIG. 2 illustrates a flight path between ports for a vehicle enabled by the system of FIG. 1, in accordance with embodiments of the present invention.

FIG. 2 illustrates a flight path 200 between ports 210a . . . 210c for a vehicle 204 enabled by a system 100 of FIG. 1, in accordance with embodiments of the present invention. Flight path 200 is determined based on factors such as current environmental conditions (e.g., weather, air pressure, altitude, wind, etc.), flight conditions (e.g., speed, trajectory duration of flight, frequency, near field detection, GPS, etc.), vehicle characteristics (e.g., a model, a maximum weight supported, a current load being carried, a fuel/charge, etc.), and data related to additional vehicles traveling near path 200. Flight path 200 may be modified based on the aforementioned factors. Ports 210a . . . 210c are defined herein as devices for vehicle 204 to land on and depart from. Vehicle 204 is enabled to autonomously select a route of travel between ports 210a . . . 210c based on analysis of the aforementioned factors. Additionally, ports 210a . . . 210c coordinate actions of vehicle 204 via a controller (controllers 14a or 14n of FIG. 1). A controller may be enabled to capture and process factor related data from vehicle 204 and generate flight path 200. Flight path 200 is transmitted to ports 210a . . . 210c. Additionally, the controller is enabled to receive control information from to ports 210a . . . 210c, process the control information, and transmit the control information to vehicle 204 to modify flight path 200 with respect to matching availability, schedules, and/or capacity of ports 210a . . . 210c.

Figure 3:
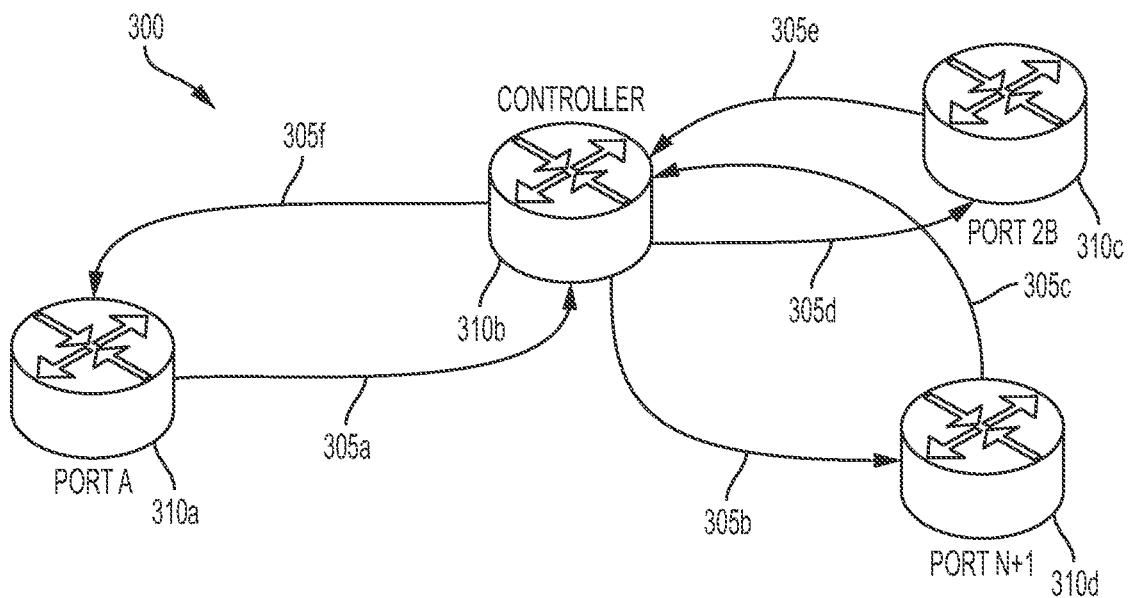
FIG. 3 illustrates an overall flight plan between ports enabled by the system of FIG. 1, in accordance with embodiments of the present invention.

FIG. 3 illustrates an overall flight plan 300 between ports 310a . . . 310d enabled by a system 100 of FIG. 1, in accordance with embodiments of the present invention. Flight plan 300 comprises flight paths 305a . . . 305f between ports 310a . . . 310d. Ports 310a . . . 310d are configured to transmit control data to associated vehicles via controllers. Additionally, controllers are configured to transmit flight path instructions (for each associated vehicle) to ports 310a . . . 310d for coordination purposes. Each vehicle is associated with a controller such that each vehicle transmits detailed flight related information to its associated controller.

Figure 4:
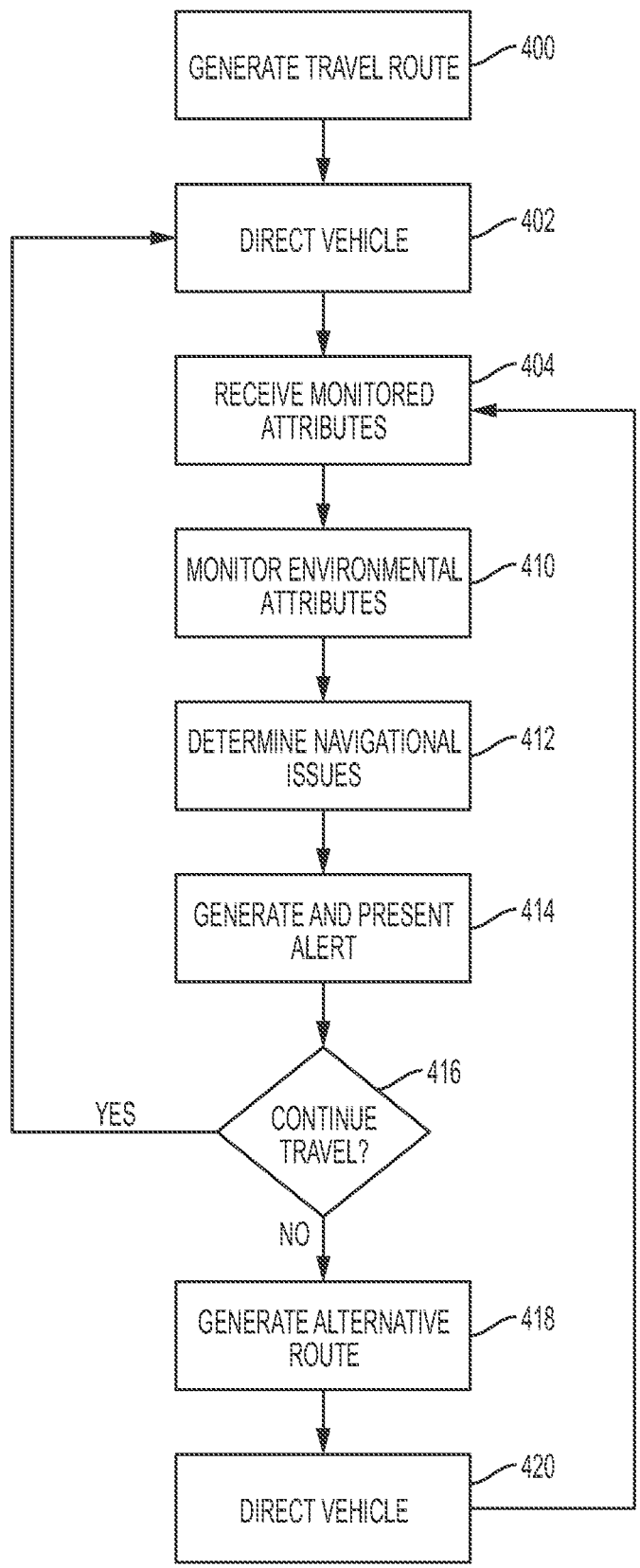
FIG. 4 illustrates an algorithm detailing a process flow enabled by the system of FIG. 1 for modifying a vehicle route of travel based on external factors, in accordance with embodiments of the present invention.

FIG. 4 illustrates an algorithm detailing a process flow enabled by system 100 of FIG. 1 for modifying a vehicle route of travel based on external factors, in accordance with embodiments of the present invention. Each of the steps in the algorithm of FIG. 4 may be enabled and executed in any order by a computer processor(s) or any type of specialized hardware executing computer code. In step 400, an original route of travel for a vehicle is generated. The original route of travel is generated for travel from an original location to a destination location. The original route of travel may be generated based on a brand of vehicle, a serial number of the vehicle, a company owning the vehicle, the original location, the destination location, an estimated time of travel from the original location to the destination location, weather condition related instructional data, etc. In step 402, the vehicle is directed from the original location to the destination location such that said vehicle initiates motion and navigates the original route of travel towards the destination location. In step 404, monitored vehicular attributes of the vehicle are received (by a controller) from the vehicle. The monitored vehicular attributes may include, inter alia, mechanical attributes of the vehicle, electrical attributes of the vehicle, fuel related attributes of the vehicle, etc. In step 410, environmental attributes associated with the original route of travel with respect the vehicle are monitored. The environmental attributes may include, inter alia, weather related conditions, trajectory related conditions, additional vehicle routes of travel associated with intersecting with the original route of travel, etc. In step 412, navigational issues associated with the vehicle traveling along the original route of travel are determined based on the monitoring results of steps 404 and 410. In step 414, an alert indicating the navigational issues is generated and presented to a user. In step 416, it is determined if the vehicle should continue to travel along the original route of travel based on the determined navigational issues of step 412. If in step 416, it is determined that the vehicle should continue to travel along the original route of travel then step 402 is repeated. If in step 416, it is determined that the vehicle should not continue to travel along the original route of travel then in step 418, an alternative route of travel (to a same or differing destination) for the vehicle is generated based on the navigational issues determined in step 412. In step 420, the vehicle is directed along the alternative route of travel and step 404 is repeated.

Figure 5:
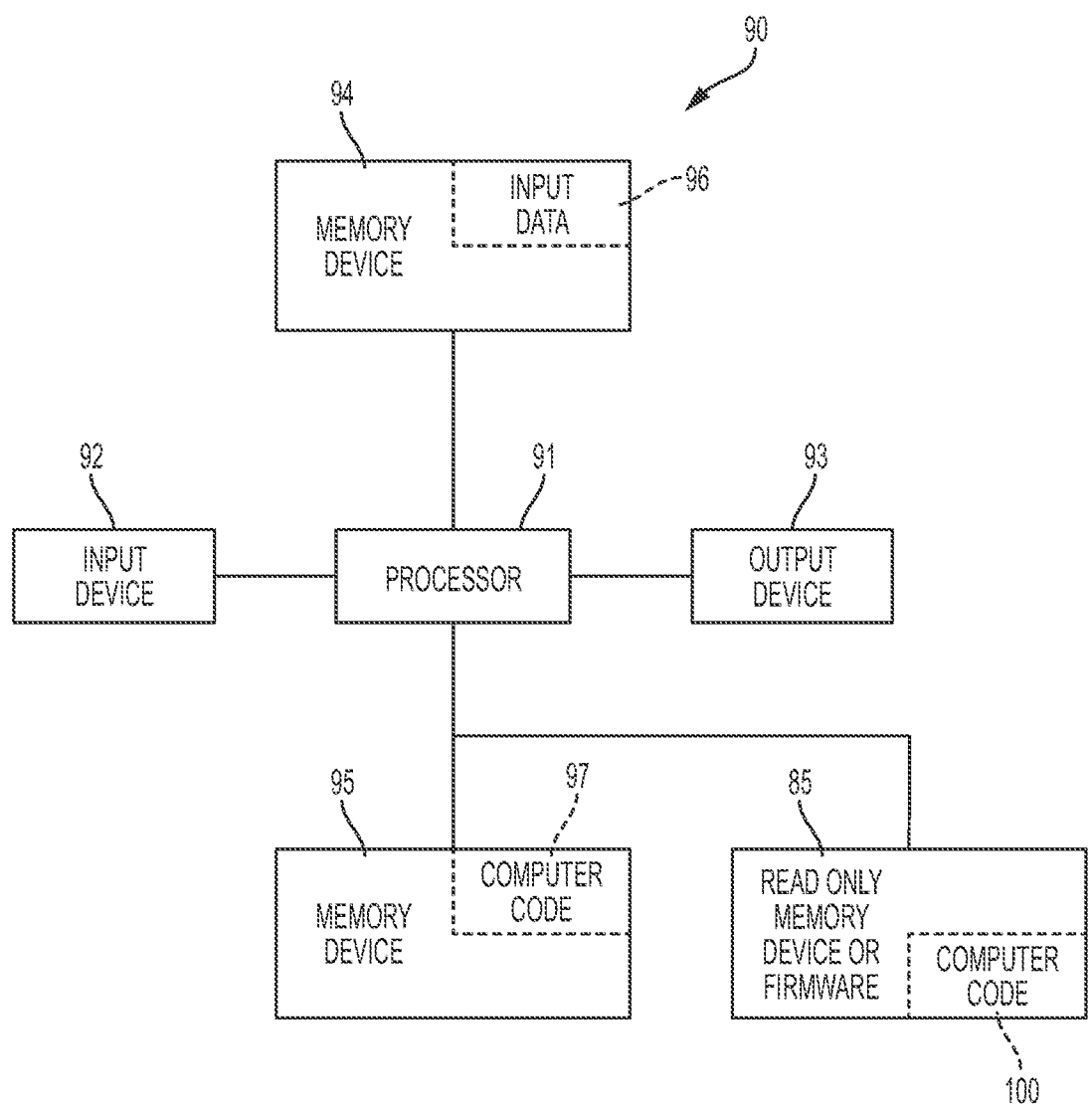
FIG. 5 illustrates a computer system used by the system of FIG. 1 for enabling a process for modifying a vehicle route of travel based on external factors, in accordance with embodiments of the present invention.

FIG. 5 illustrates a computer system 90 (e.g., control hardware 119a . . . 119n internal to vehicles 114a . . . 114n, control hardware 117a . . . 117n internal to vehicles 115a . . . 115n and control apparatuses 14a and 14n) used by or comprised by the system of FIG. 1 for enabling a process for modifying a vehicle route of travel based on external factors, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 4) for enabling a process for modifying a vehicle route of travel based on external factors. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIG. 4) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithm) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for modifying a vehicle route of travel based on external factors. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for modifying a vehicle route of travel based on external factors. In another embodiment, the invention provides a business method that performs the process steps of the invention on a subscription, advertising, and/or fee basis. That is, a service supplier, such as a Solution Integrator, could offer to enable a process for enabling a process for modifying a vehicle route of travel based on external factors. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated vehicle control method comprising:

generating, by a processor of controller, multiple differing routes of travel for a first vehicle for travel from an original location to a destination location, wherein said multiple differing routes of travel are generated based on factors comprising: a brand of said first vehicle, a serial number of said first vehicle, a company owning said first vehicle, said original location, said destination location, an estimated time of travel from said original location to said destination location, and weather condition related instructional data;

autonomously selecting via said first vehicle, by said processor based on analysis of said factors, an original route of travel from said multiple differing routes of travel;

transmitting, by said processor to a plurality of ports configured to enable landing and departure functions for said first vehicle, a flight path associated with said original route of travel selected from said multiple differing routes of travel;

transmitting, by said processor to said plurality of ports, flight path instructions for each vehicle of a plurality of vehicles with respect to enabling coordination of flight paths of said plurality of vehicles with respect to said flight path of said first vehicle;

coordinating, by said processor in response to said flight path instructions and commands from said plurality of ports, actions of said first vehicle;

receiving, by said processor from said plurality of ports in response to said coordinating said actions, transmitted control data associated with said first vehicle with respect to matching availability, schedules, and a capacity of said plurality of ports;

directing, by said processor in accordance with said original route of travel with respect to said control data transmitted from said plurality of ports, said first vehicle from said original location to said destination location such that said first vehicle initiates motion and navigates said original route of travel towards said destination location;

receiving, by said processor from said first vehicle via optical sensors, weight sensors, temperature sensors, and pressure sensors of said first vehicle, monitored vehicular attributes of said first vehicle traveling from said original location to said destination location, wherein said monitored vehicular attributes comprise a maximum weight supported by said first vehicle, a current load being carried by said first vehicle, mechanical attributes of said first vehicle, electrical charge attributes of said first vehicle, and a fuel/charge for said first vehicle;

monitoring, by said processor, environmental attributes associated with said original route of travel with respect to said first vehicle, wherein said environmental attributes comprise weather conditions, air pressure conditions, altitude conditions, and wind conditions associated with said original route of travel with respect said first vehicle;

monitoring, by said processor, flight conditions associated with said original route of travel with respect said first vehicle, wherein said flight conditions comprise a current speed of said first vehicle, a trajectory of said first vehicle, duration of flight with respect to said original route of travel, a frequency associated with said first vehicle, a near field detection of said first vehicle, and a current GPS signal associated with said original route of travel with respect said first vehicle;

first determining, by said processor based on said monitored vehicular attributes, results of said monitoring said flight conditions, and results of said monitoring said environmental attributes, navigational issues associated with said first vehicle traveling along said original route of travel;

second determining, by said processor based on said navigational issues, if said first vehicle should continue to travel along said original route of travel;

additionally directing, by said processor in response to results of said second determining, said first vehicle such that said first vehicle initiates further motion and navigates towards said destination location; and enabling, by said processor via a port of said plurality of ports, said first vehicle to operate such that said first vehicle lands at said port.

2. The method of claim 1, further comprising:

generating, by said processor, an alert indicating said navigational issues; and presenting, by said processor to a user via an output device, said alert.

3. The method of claim 1, wherein results of said second determining indicate that said first vehicle should continue to travel along said original route of travel, and wherein said method further comprises:

directing, by said processor, said first vehicle along said original route of travel from said original location to said destination location.

4. The method of claim 1, wherein results of said second determining indicate that said first vehicle should not continue to travel along said original route of travel, and wherein said method further comprises:

generating, by said processor based on said navigational issues, an alternative route of travel for said first vehicle; and directing, by said processor, said vehicle along said alternative route of travel such that said first vehicle initiates motion and navigates said alternative route of travel.

5. The method of claim 4, wherein said alternative route of travel directs said first vehicle to travel to said destination location via an alternative route differing from said original route of travel.

6. The method of claim 4, wherein said alternative route of travel directs said first vehicle to travel to an alternative destination location via an alternative route differing from said original route of travel.

7. The method of claim 1, wherein said directing comprises said processor controlling said first vehicle from said original location to said destination location via said original route of travel.

8. The method of claim 1, wherein said directing comprises transmitting, to said first vehicle, a flight plan indicating said original route of travel such that said first vehicle controls navigation along said original route of travel towards said destination location.

9. The method of claim 1, further comprising:
providing at least one support service for at least one of creating, integrating, hosting, maintaining, and deploying computer-readable code in the controller, said code being executed by the processor to implement: said generating, said retrieving, said first determining, and said second determining.

10. A computer program product, comprising a non-transitory computer readable hardware storage device storing a computer readable program code, said computer readable program code comprising an algorithm that when executed by a processor of a controller implements an automated vehicle control, said method comprising:
generating, by said processor, multiple differing routes of travel for a first vehicle for travel from an original location to a destination location, wherein said multiple differing routes of travel are generated based on factors comprising: a brand of said first vehicle, a serial number of said first vehicle, a company owning said first vehicle, said original location, said destination location, an estimated time of travel from said original location to said destination location, and weather condition related instructional data;
autonomously selecting via said first vehicle, by said processor based on analysis of said factors, an original route of travel from said multiple differing routes of travel;
transmitting, by said processor to a plurality of ports configured to enable landing and departure functions for said first vehicle, a flight path associated with said original route of travel selected from said multiple differing routes of travel;
transmitting, by said processor to said plurality of ports, flight path instructions for each vehicle of a plurality of vehicles with respect to enabling coordination of flight paths of said plurality of vehicles with respect to said flight path of said first vehicle;
coordinating, by said processor in response to said flight path instructions and commands from said plurality of ports, actions of said first vehicle;
receiving, by said processor from said plurality of ports in response to said coordinating said actions, transmitted control data associated with said first vehicle with respect to matching availability, schedules, and a capacity of said plurality of ports;
directing, by said processor in accordance with said original route of travel with respect to said control data transmitted from said plurality of ports, said first vehicle from said original location to said destination location such that said first vehicle initiates motion and navigates said original route of travel towards said destination location;
receiving, by said processor from said first vehicle via optical sensors, weight sensors, temperature sensors, and pressure sensors of said first vehicle, monitored vehicular attributes of said first vehicle traveling from said original location to said destination location, wherein said monitored vehicular attributes comprise a maximum weight supported by said first vehicle, a current load being carried by said first vehicle, mechanical attributes of said first vehicle, electrical charge attributes of said first vehicle, and a fuel/charge for said first vehicle;
monitoring, by said processor, environmental attributes associated with said original route of travel with respect to said first vehicle, wherein said environmental attributes comprise weather conditions, air pressure conditions, altitude conditions, and wind conditions associated with said original route of travel with respect said first vehicle;
monitoring, by said processor, flight conditions associated with said original route of travel with respect said first vehicle, wherein said flight conditions comprise a current speed of said first vehicle, a trajectory of said first vehicle, duration of flight with respect to said original route of travel, a frequency associated with said first vehicle, a near field detection of said first vehicle, and a current GPS signal associated with said original route of travel with respect said first vehicle;
first determining, by said processor based on said monitored vehicular attributes, results of said monitoring said flight conditions, and results of said monitoring said environmental attributes, navigational issues associated with said first vehicle traveling along said original route of travel;
second determining, by said processor based on said navigational issues, if said first vehicle should continue to travel along said original route of travel;
additionally directing, by said processor in response to results of said second determining, said first vehicle such that said first vehicle initiates further motion and navigates towards said destination location; and
enabling, by said processor via a port of said plurality of ports, said first vehicle to operate such that said first vehicle lands at said port.

11. The computer program product of claim 10, wherein said method further comprises:
generating, by said processor, an alert indicating said navigational issues; and
presenting, by said processor to a user via an output device, said alert.

12. The computer program product of claim 10, wherein results of said second determining indicate that said first vehicle should continue to travel along said original route of travel, and wherein said method further comprises:
directing, by said processor, said first vehicle along said original route of travel from said original location to said destination location.

13. The computer program product of claim 10, wherein results of said second determining indicate that said first vehicle should not continue to travel along said original route of travel, and wherein said method further comprises:
generating, by said processor based on said navigational issues, an alternative route of travel for said first vehicle; and
directing, by said processor, said first vehicle along said alternative route of travel such that said first vehicle initiates motion and navigates said alternative route of travel.

14. The computer program product of claim 13, wherein said alternative route of travel directs said first vehicle to travel to said destination location via an alternative route differing from said original route of travel.

15. The computer program product of claim 13, wherein said alternative route of travel directs said first vehicle to travel to an alternative destination location via an alternative route differing from said original route of travel.

16. The computer program product of claim 10, wherein said directing comprises said processor controlling said first vehicle from said original location to said destination location via said original route of travel.

17. A controller comprising a processor coupled to a computer-readable memory unit, said memory unit comprising instructions that when executed by the processor executes an automated vehicle control method comprising:

generating, by said processor, multiple differing routes of travel for a first vehicle for travel from an original location to a destination location, wherein said multiple differing routes of travel are generated based on factors comprising: a brand of said first vehicle, a serial number of said first vehicle, a company owning said first vehicle, said original location, said destination location, an estimated time of travel from said original location to said destination location, and weather condition related instructional data;

autonomously selecting via said first vehicle, by said processor based on analysis of said factors, an original route of travel from said multiple differing routes of travel;

transmitting, by said processor to a plurality of ports configured to enable landing and departure functions for said first vehicle, a flight path associated with said original route of travel selected from said multiple differing routes of travel;

transmitting, by said processor to said plurality of ports, flight path instructions for each vehicle of a plurality of vehicles with respect to enabling coordination of flight paths of said plurality of vehicles with respect to said flight path of said first vehicle;

coordinating, by said processor in response to said flight path instructions and commands from said plurality of ports, actions of said first vehicle;

receiving, by said processor from said plurality of ports in response to said coordinating said actions, transmitted control data associated with said first vehicle with respect to matching availability, schedules, and a capacity of said plurality of ports;

directing, by said processor in accordance with said original route of travel with respect to said control data transmitted from said plurality of ports, said first vehicle from said original location to said destination location such that said first vehicle initiates motion and navigates said original route of travel towards said destination location;

receiving, by said processor from said first vehicle via optical sensors, weight sensors, temperature sensors, and pressure sensors of said first vehicle, monitored vehicular attributes of said first vehicle traveling from said original location to said destination location, wherein said monitored vehicular attributes comprise a maximum weight supported by said first vehicle, a current load being carried by said first vehicle, mechanical attributes of said first vehicle, electrical charge attributes of said first vehicle, and a fuel/charge for said first vehicle;

monitoring, by said processor, environmental attributes associated with said original route of travel with respect to said first vehicle, wherein said environmental attributes comprise weather conditions, air pressure conditions, altitude conditions, and wind conditions associated with said original route of travel with respect said first vehicle;

monitoring, by said processor, flight conditions associated with said original route of travel with respect said first vehicle, wherein said flight conditions comprise a current speed of said first vehicle, a trajectory of said first vehicle, duration of flight with respect to said original route of travel, a frequency associated with said first vehicle, a near field detection of said first vehicle, and a current GPS signal associated with said original route of travel with respect said first vehicle;

first determining, by said processor based on said monitored vehicular attributes, results of said monitoring said flight conditions, and results of said monitoring said environmental attributes, navigational issues associated with said first vehicle traveling along said original route of travel;

second determining, by said processor based on said navigational issues, if said first vehicle should continue to travel along said original route of travel;

additionally directing, by said processor in response to results of said second determining, said first vehicle such that said first vehicle initiates further motion and navigates towards said destination location; and enabling, by said processor via a port of said plurality of ports, said first vehicle to operate such that said first vehicle lands at said port.

18. The controller of claim 17, wherein said method further comprises:

generating, by said processor, an alert indicating said navigational issues; and presenting, by said processor to a user via an output device, said alert.

* * * * *